MACHINE FOR MOUNTING AND PROOFING RUBBER PRINTING PLATES

Filed March 15, 1965 4 Sheets-Sheet 1

INVENTORS
ROLF HOEXTER
THOMAS MASON MORRIS
BY
ATTORNEY

INVENTORS
ROLF HOEXTER
THOMAS MASON MORRIS
ATTORNEY

MACHINE FOR MOUNTING AND PROOFING RUBBER PRINTING PLATES

Filed March 15, 1965 4 Sheets-Sheet 3

INVENTORS
ROLF HOEXTER
THOMAS MASON MORRIS
[signature]
ATTORNEY

INVENTORS
ROLF HOEXTER
THOMAS MASON MORRIS
BY
ATTORNEY

United States Patent Office 3,361,060

Patented Jan. 2, 1968

3,361,060
MACHINE FOR MOUNTING AND PROOFING RUBBER PRINTING PLATES

Rolf Hoexter, Fort Lee, N.J., and Thomas M. Morris, New York, N.Y., assignors to Mosstype Corporation, Waldwick, N.J., a corporation of New York Filed Mar. 15, 1965, Ser. No. 439,575
12 Claims. (Cl. 101—216)

This invention relates generally to machines for mounting rubber printing plates and for obtaining proofs therefrom, and more particularly to a machine of this type adapted to mount rubber printing plates on a removable carrier which is attachable to a fixed cylinder flexographic press.

In the flexographic process, printing is effected by rubber printing plates mounted on cylinders, the paper to be printed being impressed on the inked printing plates. Ordinarily, after a printing job is completed, the press must be shut down while a new set of printing plates is positioned, registered, and made ready directly on the printing cylinder. In practice, the down-time can last as long as two to three hours.

In order to obviate the need to shut down the flexographic press, removable carriers have been developed which are readily attachable to a fixed cylinder in the press. The rubber printing plates are mounted on the carrier and the complete, ready-to-print setup is then transferred to the press cylinder. When a run is over, the operator simply removes the carrier from the press cylinder and replaces it with a carrier containing plates for the next job. By the use of such rubber plate carriers, which are known commercially under the trademark "Snap Lok," a press may be kept running almost continuously.

Although the removable carrier does away with the necessity for shutting down the press while mounting the printing plates, it is still essential that the printing plates be positioned accurately on the carrier. This is a time-consuming operation heretofore carried out largely by measurement, and entailing a high order of skill. The difficulties encountered in seeking to properly position rubber printing plates on carriers are compounded in color printing operations calling for two or more carriers and requiring color-to-color registration.

Accordingly, it is the principal object of this invention to provide a machine for accurately and quickly mounting rubber printing plates on a plate cylinder and for obtaining proofs thereof. While the invention will be described mainly in connection with plate cylinders having removable carriers thereon, it will be recognized that the principles underliyng the invention are also applicable to the mountng of printing plates directly onto a plate cylinder which is then transferred in toto to the press, as well as to the mounting of the plates on a removable carrier whereby only the carrier is transferred to the press.

More specifically, it is an object of the invention to provide a machine of this type which includes a "Snap Lok" plate cylinder similar to the plate cylinder in the printing press, the "Snap Lok" cylinder being retractable with respect to an impression cylinder to which is affixed a sample copy or master. By means of a tracking device which defines the points of correspondence between the sample copy and the carrier at the retracted position, rubber printing plates may be mounted on the carrier at their proper locations.

A significant feature of the invention resides in the fact tht the rubber printing plates may be exactly mounted by a semi-skilled operator without measurement, and that once the plates are mounted, the "Snap Lok" cylinder may be quickly brought from the retracted position into printing engagement with the impression cylinder to permit a proof to be taken.

Also an object of the invention is to provide a machine of the above type wherein the tracking device is slidable across a slide bar extending along a path parallel to the "Snap Lok" cylinder, to facilitate positioning of the printing plates thereon, and wherein the tracking device on the slide bar is then replaceable by a brayer carriage to effect uniform inking of the printing plates.

It is yet another object of the invention to provide tracking devices either capable of bringing about precise parallel registration of the printing plates with the printed matter on the sample copy, or of effecting skew mounting of the printing plates, as may be required in certain types of envelope printing operations.

A further object of the invention is to provide a mounting and proofing machine which is reliable and efficient in operation, and which may be manufactured and sold at relatively low cost to effect significant economies in flexographic production.

Briefly stated, these objects are realized in a machine including an impression cylinder onto which a sample copy is attachable, the impression cylinder cooperating with a plate cylinder onto which a carrier is attachable, the plate cylinder being retractable from a proofing position wherein the printing plates mounted on the carrier make contact with the surface of the impression cylinder, to a mounting position wherein the plate cylinder is displaced from but is parallel to the impression cylinder.

The two cylinders are mechanically intercoupled whereby rotation of the impression cylinder causes the plate cylinder to cover the same peripheral distance, when the diameter of the impression cylinder is the same as the printing diameter of the plate cylinder (i.e., the diameter of the plate cylinder plus the carrier and the printing plates thereon). This is accomplished by mechanically intercoupling the two cylinders in a one-to-one ratio. But when the diameters of the cylinders are at variance, the gear ratio is made such as to accomplish the same result.

Slidable along a path parallel to the longitudinal axes of both cylinders is a tracking device having a sighting viewer extending tangentially with respect to the impression cylinder, and a mounting viewer extending tangentially with respect to the plate cylinder. A longitudinal guide line is inscribed on each viewer, the distance between the two lines being equal to the distance between the parallel axes of the impression and plate cylinders in the mounting position.

Thus each point on the sample copy in alignment with a transverse line intersecting the guide line of the sighting viewer and forming a cross-hair therewith, finds its corresponding point on a cross-hair similarly formed on the mounting viewer in terms of longitudinal and circumferential coordinates. The mounting viewer is elevated sufficiently from the carrier on the plate cylinder to permit the rubber printing plates to be placed under the viewer at their proper locations on the carrier.

For a better understanding of the invention, as well as other objects and further features thereof, reference is made to the following detailed description to be read in conjunction with the accompanying drawings, wherein:

FIG. 1 is a longitudinal section taken through a preferred embodiment of a machine in accordance with the invention for mounting printing plates on a removable carrier and for obtaining proofs therefrom;

FIG. 1A schematically shows the relationship of the impression and plate cylinders with respect to the horizontal guide lines on the windows of the tracking device when the plate cylinder occupies its retracted mounting position;

Figure 1:
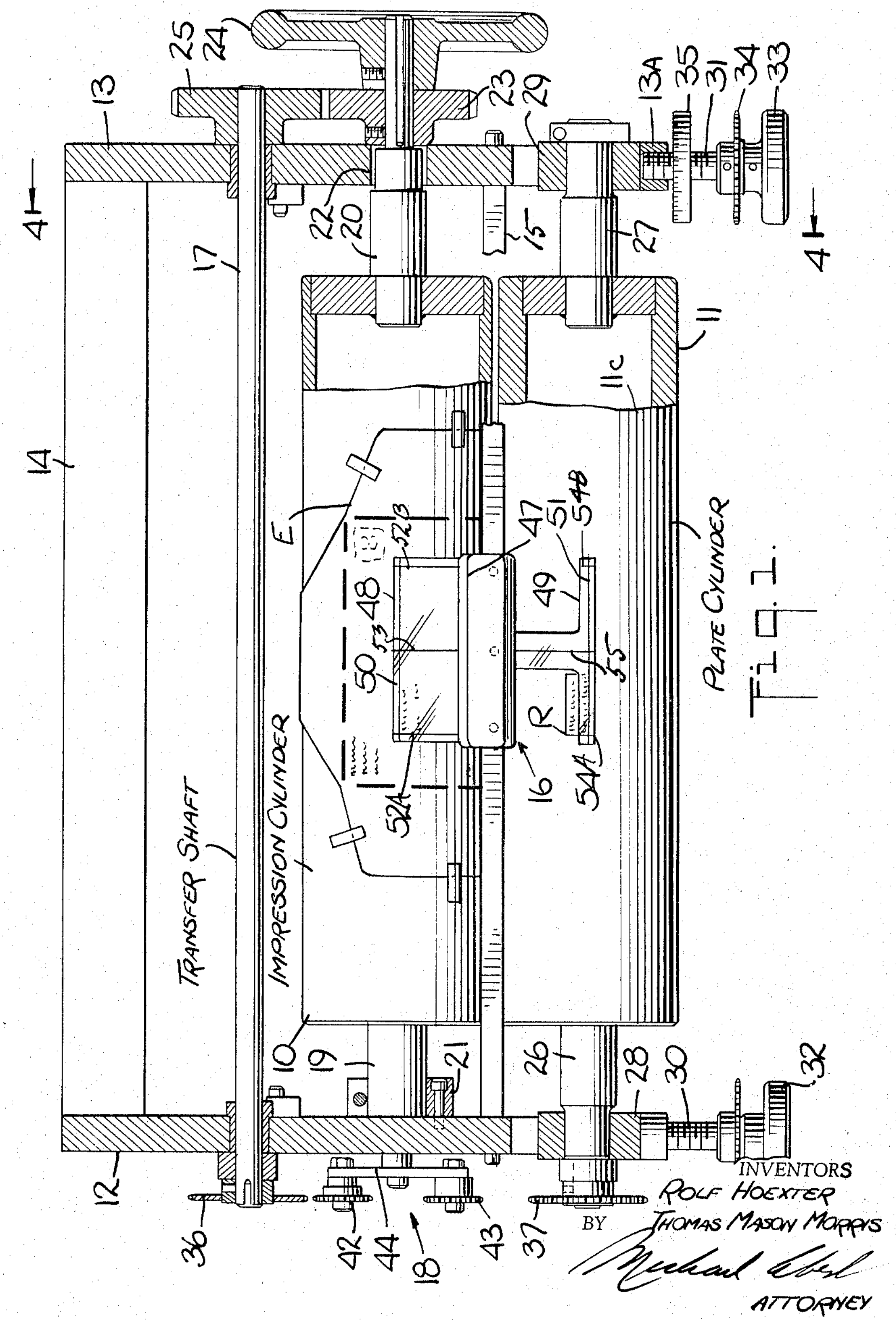
Figures 1A, 9:
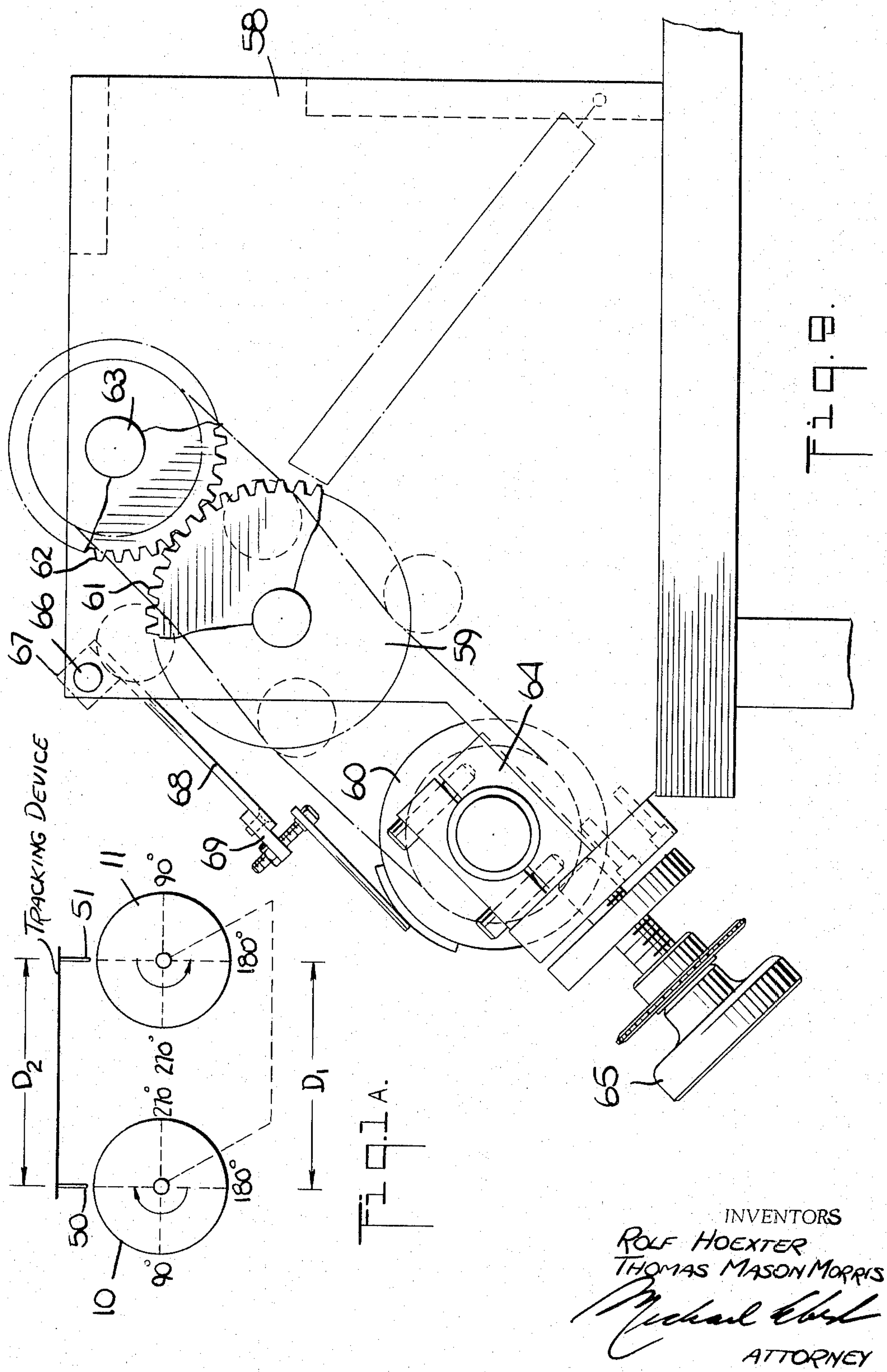
Figures 5, 6, 7, 8:
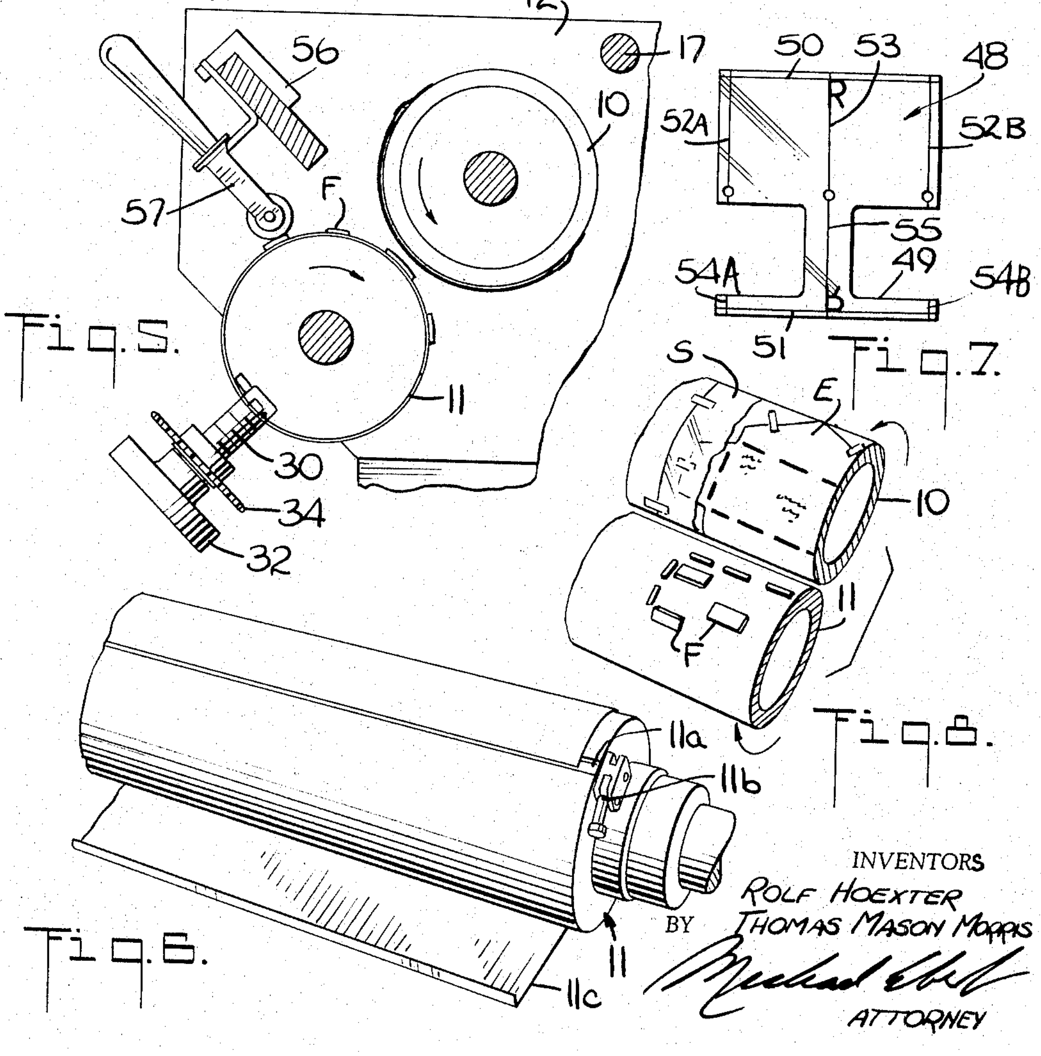
FIG. 5 is the same as FIG. 4, except that the tracking device is replaced by a brayer assembly.
FIG. 6 illustrates in perspective how the carrier is attached to the plate cylinder.

FIG. 7 separately shows in plan view the tracking device viewers;

FIG. 8 in perspective shows the relationship of the impression and plate cylinders when obtaining a proof; and FIG. 9 is an end view of another preferred embodiment of a machine in accordance with the invention.

Referring now to the drawings and more particularly to FIGS. 1 to 4, there is shown a machine acording to the invention for mounting and proofing rubber printing plates. The machine comprises an impression cylinder 10 and a plate cylinder 11 rotatably supported between the side frames 12 and 13 which are maintained at spaced parallel positions by cross-braces 14A and 14B. Also supported between the side frames at a position parallel to the longitudinal axes of both cylinders is a slide bar 15 having a rectangular cross-section, the bar also acting to brace the frame. Slidable along the bar is a tracking device, generally designated by numeral 16.

The two cylinders are mechanically intercoupled, whereby rotation of the impression cylinder 10 brings about a corresponding rotation of the plate cylinder 11. This is accomplished by means of a transfer shaft 17 extending parallel to the axes of the cylinders, the ends of the shaft being journalled in the side frames 12 and 13 and projecting therethrough. One end of shaft 17 is geared to the impression cylinder to turn therewith, the other end thereof being operatively coupled through a sprocket and chain system, generally designated by numeral 18, to the plate cylinder 11.

Impression cylinder 10 is rotatably supported at a fixed position by axle members 19 and 20, axle 19 being journalled in a bearing 21 attached to side frame 12. Axle 20 is journalled in a bearing 22 formed in side frame 13 and projects therethrough. Keyed to axle 22 is a gear 23 and a handwheel 24. Gear 23 intermeshes with a like gear 25 secured to the end of shaft 17 so that when wheel 24 is manually turned to rotate the impression cylinder, shaft 17 is caused to turn accordingly.

Plate cylinder 11 is supported by axle members 26 and 27 journalled in bearing blocks 28 and 29, respectively, which are simultaneously shiftable on the side frames to bring the plate cylinder from a proofing position wherein the printing plates engage the surface of the impression cylinder, to a retracted position in which the longitudinal axis of the plate cylinder is spaced a predetermined distance from the longitudinal axis of the impression cylinder.

This shift in position is effected by jacking screws 30 and 31 threadably received in brackets 12A and 13A attached to the front edges of side frames 12 and 13, respectively. The ends of the screws extend through the brackets and engage the side frames 12 and 13 and bearing blocks 28 and 29. Screws 30 and 31 are operated by knobs 32 and 33 so that as the screws are advanced into their associated brackets, they push the bearing blocks 28 and 29, thereby moving the plate cylinder toward the impression cylinder. When the screws are withdrawn, the bearing blocks are similarly withdrawn by gravity action.

In order to cause concurrent turning of the screws and thereby maintain the axis of the plate cylinder in parallel relationship with the axis of the impression cylinder, knob 32 is ganged to knob 33 by a continuous chain 34. The position of the screws is indicated by a calibrated dial 35 secured to screw 31.

Figures 2, 3:
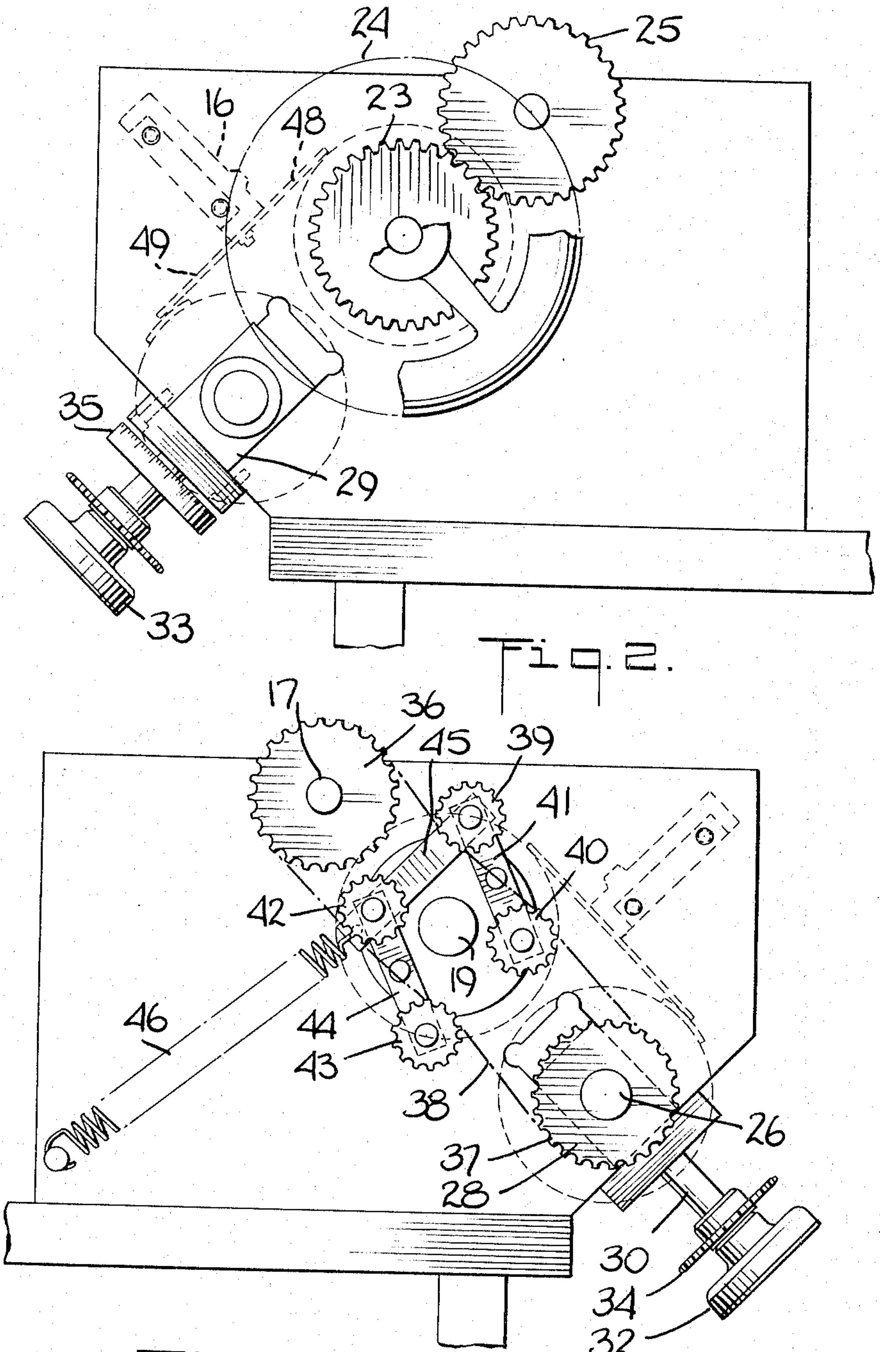
FIG. 2 is an elevational view of the machine as seen at the right end thereof.
FIG. 3 is an elevational view of the machine as seen at the left end thereof.

The sprocket and chain system 18 intercoupling shaft 17 and plate cylinder 11, is constituted by a sprocket wheel 36 attached to the left end of shaft 17 and a sprocket wheel 37 attached to axle 26, the two wheels being intercoupled by a sprocket chain 38, as shown in FIG. 3. Since the position of sprocket wheel 37 relative to sprocket wheel 36 shifts as bearing block 28 is moved inwardly or retracted, it is necessary to take up the resultant slack on the sprocket chain to maintain the chain taut, thereby keeping sprocket wheel 37 in operative engagement with sprocket wheel 36. This is accomplished by two pairs of idler sprockets.

As best seen in FIG. 3, one pair of idler sprockets 39 and 40 is mounted on opposite ends of a pivoted strip 41 and engages opposing sides of the upper portion of sprocket chain 38, the other pair 42 and 43 being mounted on opposite ends of a pivoted strip 44 and engaging opposing sides of the lower portion of the sprocket chain 38. The two pivoted strips are interconnected by a linkpiece 45 which is attached to one end of a spring 46.

Thus when the bearing block is fully retracted, the upper and lower portions of the sprocket chain 38 are substantially linear, but when the bearing block is moved inwardly, the spring 46 acts to swing the two pairs of idler sprockets to cause the upper and lower chain portions to assume a zig-zag formation taking up the slack. The linear motion of the plate cylinder toward the impression cylinder takes place without causing rotary displacement of either cylinder, and hence without disturbing the rotational relationship of the sample copy on the impression cylinder to the printing plates on the plate cylinder.

The tracking device 16 is constituted by a carriage 47 slidable along slide bar 15, to which carriage is attached a transparent rectangular guide viewer 48 extending tangentially relative to the impression cylinder 10 and a T-square shaped mounting viewer 49. As best seen in FIG. 7, the two viewers are integral with each other.

Inscribed on the underside of guide viewer 48 is a longitudinal guide line 50, and inscribed on the underside of mounting viewer 49 is a longitudinal guide line 51. Three transverse lines 52A, 52B and 53 intersect guide line 50 to form cross-hairs therewith adjacent the ends of line 50 and at the center thereof, and similar cross-hairs are formed on line 51 by transverse lines 54A, 54B and 55. Obviously, a greater number of cross-hairs may be inscribed if such is deemed useful.

Both viewers are preferably formed of an optically clear and undistorted acrylic material such as "Plexiglas." The T-square mounting viewer is elevated somewhat above the plate cylinder to permit the insertion of rubber printing plates therebelow, this viewer being somewhat flexible so that it may be pressed down on the printing plate to ensure exact alignment of the plate with the cross-hairs on the viewer.

The plate cylinder 11, as best seen in FIG. 6, is of the "Snap Lok" type, and is disclosed more fully in the copending application Ser. No. 183,821, filed Mar. 30, 1962. This cylinder is a precision-made steel roll with a narrow groove *11a* cut across its face. A cam bar mechanism (not shown) recessed in this groove is caused to open and close by means of spring-loaded levers *11b* to secure or release the carrier *11c*. The carrier *11c* is made of flexible shim steel and has precision-formed, right-angle ends that fit into groove *11a*.

Thus the carrier *11c* is wrapped around the plate cylinder 11, the ends being inserted in the grooves and being locked therein. After the printing plates are mounted on the carrier in the machine, the carrier is released and is then transferred to an identical plate cylinder in the rotary rubber-plate flexographic press. The printing plates may be provided with pressure-sensitive backings or double faced adhesives to facilitate quick mounting.

The "Snap Lok" carrier requires no tensioning or stretching devices, and the carrier wraps around the cylinder in a perfect, skin-tight fit. While the use of such carriers is preferred, it is to be understood that the invention is operable with any other commercially available removable carrier.

Figure 4:
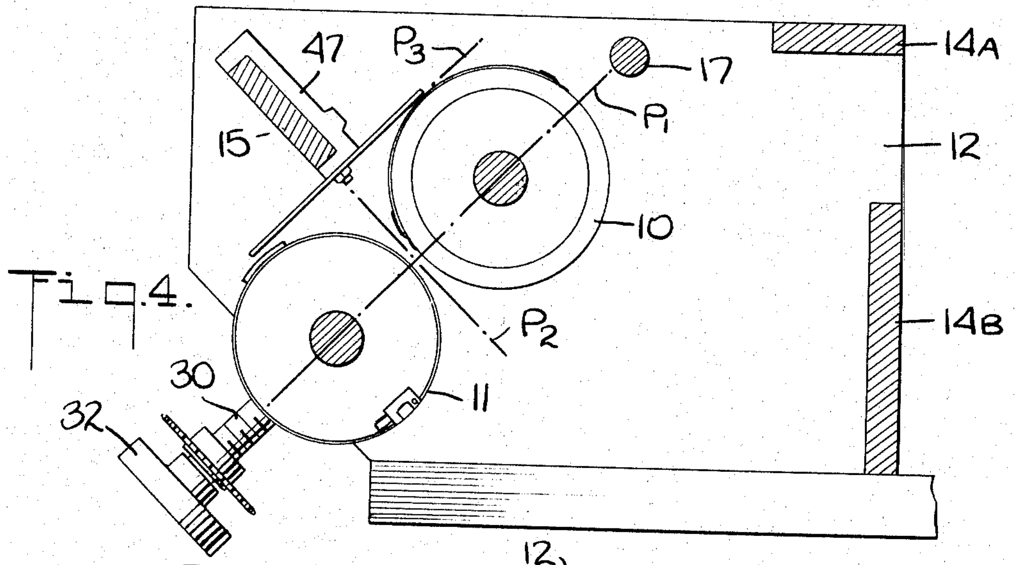
FIG. 4 is a transverse section taken in the plane indicated by line 4—4 in FIG. 1.

The geometric relationship of the main components of the machine may be seen in FIG. 4, where it will be noted that the parallel longitudinal axes of plate cylinder 11, impression cylinder 10, and shaft 17 all lie within a common inclined plane $P_1$, whereas the slide bar 15 lies in a plane $P_2$ which is perpendicular to plane $P_1$. The guide viewer 48 and the mounting viewer 49 lie within a common inclined plane $P_3$ which is parallel to the plane $P_1$ and hence is tangential to the surfaces of the cylinders.

Referring again to FIG. 1, it will be seen that attached by adhesive strips to the surface of impression cylinder 10 is a sample or master copy of an envelope E. The envelope E is mounted on the impression cylinder in alignment with longitudinal scribe lines thereon (not shown). The envelope has printed matter thereon, and the problem of mounting the rubber plates on the plate cylinder 11 involves the placement thereon of the plates at locations corresponding precisely to the locations of the printed matter on the envelope.

In order to achieve this result quickly and accurately without measurement, the axial position of the plate cylinder 11 relative to the fixed axial position of the impression cylinder 10 is adjusted so that the plate cylinder is displaced from the impression cylinder a sufficient distance to permit the mounting of the printing plates on the plate cylinder, the distance between the axis of the plate cylinder from the impression cylinder being made equal to the distance between the guide lines 50 and 51 on the tracking device.

The relationship which exists at the mounting position of the plate cylinder is illustrated in FIG. 1A, where it will be seen that the distance $D_1$ between the axes of the cylinders is precisely equal to the distance between guide lines 50 and 51 on the tracking device 16. The printing diameter of plate cylinder 11 with the carrier and the printing plates thereon is, in the embodiment illustrated, equal to the diameter of the impression cylinder. The two cylinders are mechanically intercoupled in a one-to-one ratio, so that as the impression cylinder is turned, say in the clockwise direction, one full revolution from 0° to 360°, the plate cylinder is turned counterclockwise from 0° to 360°. Hence when the longitudinal guide line 50 on the impression cylinder is aligned with any given longitudinal line along the circumference of the cylinder, the guide line 51 on the plate cylinder is aligned with a line at the same longitudinal location on the plate cylinder carrier.

Precise points along the longitudinal guide lines on the cylinders are established by the transverse lines intersecting the guide line 50 to form cross-hairs therewith, and the corresponding cross-hairs formed on guide line 51. Hence it becomes possible, as shown in FIG. 8, to pick up any printing point on the sample copy E and to place a flexible printing plate, such as plate F, at the corresponding point on the carrier on the plate cylinder. By sliding the tracking device 16 across the slide bar, the printing plates on the plate and cylinder may be laid down thereacross at the appropriate positions.

For example, as shown in FIG. 7, if the cross-hair at the intersection of lines 50 and 53 on the sighting viewer 19 is brought into alignment with the letter R on the sample thereunder, then a printing plate containing a mirror image of this letter may be mounted at a corresponding position on the plate cylinder by aligning this printing plate with the cross-hairs formed at the intersection of lines 51 and 55 on the mounting viewer 49.

Some envelope printing presses blank out a window in the envelope, and require skew mounting of the blanking die. Consequently, it becomes necessary to skew-mount the rubber printing plates as well. In order to skew-mount the printing plates, one can make use of a tracking device in which the guide viewer and the mounting viewer each have an equal but opposite angle of skew in their guide lines rather than parallel guide lines, as shown in the drawing.

After the rubber printing plates have been mounted on the carrier, as shown in FIG. 8, the sample copy E on the impression cylinder 10 is covered with a sheet S of transparent acetate or other material having an affinity for printing ink. The tracking device 16 is removed from the slide bar, and replaced by a slide carrier 56 having an ink roller or brayer 57 secured thereto (note FIG. 5). The plate cylinder 11 is then shifted forward toward the impression cylinder by turning knob 32 or 33, until the printing plates engage the surface of the acetate sheet. By rotating the two cylinders, a proof is produced on the acetate sheet, and since the sheet is transparent one can readily see whether the print is in exact registration with that on the sample envelope E.

In a three-color press using "Snap Lok" carriers or other forms of removable carriers, three "Snap Lok" cylinders are required. A fourth "Snap Lok" cylinder identical to the three cylinders on the press is incorporated in the mounting and proofing machine. After the rubber printing plates have been mounted on the carrier for one color, and a proof thereof taken, the mounted carrier is removed and the operation repeated first with a second carrier, and then with a third carrier. The proof sequentially printed by the three carriers on the impression cylinder will then show whether the three colors are in proper registration.

Thus there has been described a machine adapted to mount and proof rubber printing plates on a removable carrier which after the plates are mounted and proofed, is transferred to the plate cylinder of the flexographic press. By the use of removable carriers in the press and the machine disclosed herein, not only can the press be maintained in almost continuous operation, but the time consumed in mounting the plates is reduced substantially, thereby effecting major production economies.

In the embodiment shown in connection with FIGS. 1 to 8, the printing diameter of the plate cylinder is equal to that of the impression cylinder, hence in order to bring about an equal displacement in circumferential distance on the periphery of the plate cylinder as the impression cylinder is turned, the two cylinders are intercoupled by a one-to-one gear ratio. Hence the angle subtended by a given movement of the impression cylinder is the same as the angle subtended by the plate cylinder whose movement is linked to the impression cylinder.

In FIG. 9, we shall consider an embodiment of a mounting and proofing machine in which the plate cylinder has a printing diameter which is less than the diameter of the impression cylinder. We shall further make use of a plate cylinder which is of the standard or conventional type, and is not provided with a removable carrier. In this instance, therefore, the rubber printing plates must be mounted directly on the plate cylinder, after which the plate cylinder is transferred from the mounting and proofing machine to the flexographic press. Thus in this version of the machine, one must provide a gear ration other than one-to-one between the two cylinders, and the machine must be arranged to permit the bodily removal of the plate cylinder after mounting and proofing is effected.

In the machine shown in FIG. 9, there is provided on a frame structure including a side frame 58, an impression cylinder 59 and a plate cylinder 60 of standard design. The manner in which the two cylinders are operatively intercoupled is essentially the same as in FIGS. 1 to 8, that is, by means on one side, of a gear 61 secured to the shaft of the impression cylinder and intermeshing with a gear 62 secured to a transfer shaft 63, the other side of the transfer shaft and the plate cylinder being provided with a sprocket system.

Since one must be able to remove the entire plate cylinder 60, rather than a carrier thereon, the bearing blocks therefor, only one of which, 64, is shown, are of the split type, the blocks being shifted by knob-operated screws, one of which, 65, is shown, in a manner similar to the screw arrangement illustrated in the previous figures.

Also in order to permit removal of the plate cylinder 60, the slide bar 66 which in the previous figures is situated between the two cylinders, is now placed above the impression cylinder 59 and is of round rather than rectangular cross-section. Slidable along the bar 66 is a carriage 67 from which extends a sighting viewer 68 at a position tangentially disposed with respect to the impression cylinder. Coupled by an adjustable bracket 69 to the lower end of the sighting viewer, is a mounting viewer 70 which extends tangentially with respect to the plate cylinder 60.

Since the printing diameter of the plate cylinder (i.e., the diameter of the cylinder with the printing plates thereon) is less than the diameter of the impression cylinder, the two viewers are not coplanar, as in FIGS. 1 to 8, but are spaced apart, the appropriate adjustment being made by means of bracket 69.

We shall, by way of example, assume that the diameter of the impression cylinder 59 is 5.050", and the printing diameter of the plate cylinder 60 is 4.180". In order for the turning motion of the impression cylinder to cause the plate cylinder to traverse a peripheral distance from a longitudinal reference line which is the same as that traversed by the impression cylinder, the gear 61 on the impression cylinder is provided with 70 teeth, and the gear 62 on the transfer shaft, with 58 teeth $$\left(5.050'' \times \frac{58}{70} = 4.180''\right)$$

Obviously, for different cylinder diameters, suitable gear ratios must be chosen to accomplish the same result. It is not possible with arrangements other than a one-to-one gear ratio, to recycle the machine continuously. That is to say, after the two cylinders have been turned to traverse the same peripheral distance, but to subtend different angles, so that printing plates may be properly located on the plate cylinder at points corresponding to points on the sample on the impression cylinder, in the next turning cycle, the longitudinal scribe or guide lines on the cylinder must be brought again into registration with the longitudinal guide lines on the tracking device.

This is accomplished simply by decoupling the impression cylinder from the gear mechanism which links the impression cylinder to the plate cylinder. In practice, all that need be done is to loosen the set screw which secures gear 62 to transfer shaft 63, so that rotational movement of the impression cylinder is no longer transmitted to the plate cylinder. Then after the impression cylinder is brought into line with the plate cylinder, the set screw on gear 62 is again tightened.

It will be appreciated that while in FIG. 9, the plate cylinder is removable, the same basic arrangement may be used with a plate cylinder having a removable carrier and a printing diameter which differs from the diameter of the impression cylinder.

In still another embodiment of a mounting and proofing machine in accordance with the invention, the plate cylinder is specially designed to accommodate removable carriers sized for presses whose printing diameters are smaller than the printing diameter of the special plate cylinder, which printing diameter is equal to that of the impression cyilnder in the machine. In this way it become possible to use the same mounting and proofing machine in conjunction with a whole family of printing presses whose printing circumference ratings lie within a few inches of each other. To this end, the outside diameter of both the counterpart plate and impression cylinder in the machine is sized slightly larger than the printing diameter of the largest press in the family thereof.

To accomplish this result with the "Snap-Lok" type of removable carrier, the specially designed plate cylinder for this purpose is provided with one narrow longitudinal slot to accommodate the flange or thin lip at one end of the flexible carrier, such as carrier 11*c* in FIG. 6, two or more slightly wider slots being formed on the cylinder to permit the insertion of the lip at the other end of successively shorter carriers.

Instead of holding the carriers in place by a cam bar mechanism, as disclosed in connection with FIG. 6, the carriers are held onto the plate cylinder by adhesive tape applied at both ends thereof. After a carrier is mounted and removed for installation in the press, it is installed on the press cylinder with both lips in a common slot and locked up by the usual cam bar mechanism.

It is possible, using such specially designed plate cylinders in the mounting and proofing machine, to mount rubber plates on removable carriers, insert the necessary "make-ready" (or shimming), and proof them for a family of printing presses having respective printing circumference ratings of 13, 14, 14½ and 15 inches, without the need for a separate mounting and proofing machine for each of these sizes. Obviously, the same technique can be used for other size groupings.

In the tracking device shown in FIG. 7, the guide viewer and mounting viewer elements are formed from a single transparent plate of plastic material. To permit adjustment of the tracking device for different blanking angles on different presses, the tracking device may be constructed with guide and mounting viewers made of separate pieces. These pieces are then coupled to a suitable linkage system secured to the underside of carriage 47, the linkage being designed so that when rotating either the guide or mounting viewer about its pivot point in the linkage, the other viewer will be caused to rotate through an equal but opposite angle to provide a desired "skew" relationship therebetween. By having locking means in conjunction with the linkage system, a plurality of skewing angles can be duplicated on the mounting and proofing machine without the need for separate tracking devices for each specific angle.

In lieu of a linkage system, other mechanisms may be used to provide a range of skew angles for the viewers. Thus one may mount the guide and mounting viewers on the underside of two small precision gears which in turn are mounted below a flat member secured to the underside of the carriage in a manner whereby the centerline axes of the two gears are perpendicular to the travel of the carriage. While there have been shown and described preferred embodiments of machine for mounting and proofing rubber printing plates in accordance with the invention, it will be appreciated that many changes and modifications may be made therein without, however, departing from the essential spirit of the invention as defined in the annexed claims.

What we claim is:

1. A mounting and printing machine for flexible printing plates, said machine comprising:

(a) a rotatable impression cyclinder onto which a master is attachable, (b) a rotatable plate cylinder, (c) calibrated means to linearly shift the axial position of said plate cylinder relative to said impression cylinder without disturbing the rotational relationship of the cylinders from a proofing position at which printing plates mounted on the plate cylinder engage the surface of said impression cylinder with a desired pressure, and in which the longitudinal axes of the cylinders lie in a common plane, to a fixed limit at a retracted and parallel mounting position at which the longitudinal axes of the cylinders are spaced apart by a predetermined distance in the same plane, (d) play-free means operatively intercoupling said cylinders at both the proofing and mounting positions in a ratio appropriate to the relative diameter of the cylinders at which a rotation of said impression cylinder to an extent causing this cylinder to traverse a given peripheral distance causes the plate cylinder to traverse the same distance, and (e) a tracking device slidable along a path parallel to the longitudinal axes of said cylinders and having a guide viewer tangentially disposed relative to the impression cylinder and a mounting viewer tangentially disposed relative to the plate cylinder, said guide viewer and said mounting viewer each having a longitudinal guide line thereon, said guide lines being spaced apart by a distance equal to said predetermined distance.

2. A machine as set forth in claim 1, wherein said plate cylinder includes a removable carrier onto which said flexible printing plates are mounted, said carrier being formed of a flexible sheet having right-angle ends which are received in a longitudinal slot in said plate cylinder.

3. A machine as set forth in claim 1, wherein said plate cylinder is removably mounted in said machine whereby it is transferrable to a press.

4. A machine as set forth in claim 1, wherein the printing diameter of said plate cylinder is the same as the diameter of said impression cylinder and said cylinders are operatively intercoupled in a one-to-one ratio for synchronous rotational movement.

5. A machine as set forth in claim 1, wherein the printing diameter of said plate cyilnder is smaller than the diameter of said impression cylinder and said cylinders are operatively intercoupled in a ratio which is less than one-to-one.

6. A machine for mounting flexible printing plates on a removable carrier and for obtaining proofs therefrom, said carrier being in the form of a flexible sheet, said machine comprising:

(a) a rotatable impression cylinder onto which a sample copy is attachable, (b) a rotatable plate cylinder onto which said flexible carrier is attachable and having with the carrier and printing plates thereon the same circumference as the impression cylinder, (c) calibrated and adjustable bearing means to linearly shift the axial position of said plate cylinder relative to said impression cylinder without disturbing the rotational relationship of the cylinders from a fixed limit at a mounting position in which the surface of the plate cylinder is sufficiently retracted from that of the impression cylinder to permit the mounting of plates on said carrier, and the axis of the plate cylinder is spaced from the parallel axis of the impression cylinder by a predetermined distance, to a proofing position in which the printing plates mounted on said carrier engage the surface of said impression cylinder with a desired pressure, the axes of the cylinders in both the mounting and proofing positions lying in a common plane, (d) a play-free transmission system operatively intercoupling said cylinders in a one-to-one ratio at both the mounting and proofing positions whereby rotation of said impression cylinder effects a corresponding rotation of said plate cylinder, and (e) a tracking device slidable along a path parallel to the axes of said cylinders and having a guide viewer tangentially disposed relative to the impression cylinder and provided with a horizontal guide line to pick up particular points on said sample copy attached thereto, and having a mounting viewer tangentially disposed relative to said plate cylinder and having a horizontal guide line to locate corresponding points on said carrier, said guide lines being spaced by a distance equal to said predetermined distance.

7. A machine for mounting rubber printing plates on a removable carrier and for obtaining proofs therefrom, said machine comprising:

(a) a frame having spaced parallel side frame elements, (b) an impression cylinder rotatably mounted at a fixed position between said elements, a sample copy being attachable to said cylinder, (c) a plate cylinder rotatably mounted at either end on adjustable bearing blocks on said elements at a position which is parallel to that of said impression cylinder, (d) calibrated means to linearly shift said blocks simultaneously to move said plate cylinder from a fixed limit at a mounting position in which the surface of the plate cylinder is sufficiently retracted from that of the impression cylinder to permit the mounting of plates on said carrier and wherein the axis of the plate cylinder is spaced from the parallel axis of the impression cylinder by a predetermined distance, to a proofing position in which the printing plates mounted on the carrier engage the surface of the impression cylinder with a desired pressure, the axes of the cylinders in both the mounting and proofing positions lying in a common plane, (e) a shaft rotatably supported between said end plates, one end of said shaft being geared to said impression cylinder to cause said shaft to rotate therewith, (f) a play-free sprocket and chain system intercoupling the other end of said shaft to the corresponding end of said plate cylinder to cause said plate cylinder to rotate in one-to-one ratio upon rotation of said impression cylinder, (g) a slide bar extending between said elements in parallel to said cylinders, and (h) a tracking device having a carriage slidable along said bar and having a guide viewer tangentially disposed relative to the impression cylinder to pick up particular points on said sample copy attached thereto and having a mounting viewer tangentially disposed relative to said plate cylinder to locate corresponding points on said carrier, said viewers having guide lines thereon which are spaced apart by a distance equal to said predetermined distance.

8. A machine as set forth in claim 7, wherein said means to shift the position of said bearing blocks is constituted by a knob-operated jacking screw engaging each block, and means ganging said knobs together to produce simultaneous movement of said blocks when either knob is turned.

9. A machine as set forth in claim 7, wherein said sprocket and chain system includes a spring-biased idler sprocket to take up the slack in said chain at the proofing position of said plate cylinder, thereby to maintain the chain taut.

10. A machine as set forth in claim 7, wherein each viewer on the tracking device has a plurality of vertical lines intersecting the guide line to form cross-hairs therewith.

11. A machine as set forth in claim 7, wherein the viewers on the tracking device have opposing skew guide lines inscribed thereon.

12. A machine as set forth in claim 7, further including a brayer provided with a carriage adapted to slide on said slide bar to replace said tracking device on the slide bar for inking the printing plates.

(References on following page)

References Cited

UNITED STATES PATENTS

| | | | |
|---|---|---|---|
| 767,653 | 8/1904 | McDonald. | |
| 1,048,094 | 12/1912 | Pier et al. | 101—219 |
| 1,086,722 | 2/1914 | Langston. | |
| 1,524,071 | 1/1925 | White | 101—426 |
| 1,807,991 | 6/1931 | Lang et al. | 101—154 |
| 2,070,293 | 2/1937 | Morgan et al. | |
| 2,301,299 | 11/1942 | Luehrs | 101—247 |
| 2,994,964 | 8/1961 | Moffet | 101—426 |
| 3,186,336 | 6/1965 | Kirby | 101—216 |

FOREIGN PATENTS

| | | |
|---|---|---|
| 803,377 | 10/1958 | Great Britain. |

ROBERT E. PULFREY, *Primary Examiner.*

J. R. FISHER, *Assistant Examiner.*